United States Patent
Uramoto

(10) Patent No.: US 11,289,937 B2
(45) Date of Patent: *Mar. 29, 2022

(54) FEED SYSTEM, FEED UNIT, AND ELECTRONIC UNIT

(71) Applicant: Sony Group Corporation, Tokyo (JP)

(72) Inventor: Yoichi Uramoto, Kanagawa (JP)

(73) Assignee: Sony Group Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/573,352

(22) Filed: Sep. 17, 2019

(65) Prior Publication Data

US 2020/0014234 A1 Jan. 9, 2020

Related U.S. Application Data

(63) Continuation of application No. 15/987,296, filed on May 23, 2018, now Pat. No. 10,461,567, which is a
(Continued)

(30) Foreign Application Priority Data

Aug. 10, 2011 (JP) .................... 2011-175052
Feb. 22, 2012 (JP) .................... 2012-035835

(51) Int. Cl.
*H02J 7/02* (2016.01)
*H02J 50/10* (2016.01)
(Continued)

(52) U.S. Cl.
CPC ............. *H02J 7/025* (2013.01); *H02J 5/005* (2013.01); *H02J 7/00036* (2020.01);
(Continued)

(58) Field of Classification Search
CPC .. H02J 50/10; H02J 50/80; H02J 50/60; H02J 5/005; H02J 7/0004; H02J 7/025; H01M 2010/4278
See application file for complete search history.

(56) References Cited

U.S. PATENT DOCUMENTS 7,975,091 B2    7/2011 Uchida
9,559,524 B2*   1/2017 Uramoto ................. H02J 50/40
(Continued)

FOREIGN PATENT DOCUMENTS

CN    1941545 A    4/2007
CN    101345437 A    1/2009
(Continued)

OTHER PUBLICATIONS

Chinese Office Action dated Apr. 2, 2020 for corresponding Chinese Application No. 201710930038.2.
(Continued)

*Primary Examiner* — Ryan Johnson
(74) *Attorney, Agent, or Firm* — Michael Best & Friedrich LLP

(57) ABSTRACT

A feed system has a first electronic unit, a second electronic unit, and a feed unit. The first electronic unit and the feed unit are separated. The feed unit transmits power to a power reception section of the second electronic unit based upon result information of a first authentication between the first electronic unit and the second electronic unit. The feed unit performs a second authentication on the second electronic unit in conjunction with power transmission.

22 Claims, 6 Drawing Sheets

Related U.S. Application Data continuation of application No. 15/381,792, filed on Dec. 16, 2016, now Pat. No. 10,008,876, which is a continuation of application No. 14/130,423, filed as application No. PCT/JP2012/070588 on Aug. 7, 2012, now Pat. No. 9,559,524.

(51) Int. Cl.

| | | |
|---|---|---|
| *H02J 50/60* | (2016.01) | |
| *H02J 50/80* | (2016.01) | |
| *H02J 50/40* | (2016.01) | |
| *H02J 50/05* | (2016.01) | |
| *H02J 50/12* | (2016.01) | |
| *H02J 5/00* | (2016.01) | |
| *H02J 7/00* | (2006.01) | |
| *H01M 10/42* | (2006.01) | |
| *H01M 10/46* | (2006.01) | |

(52) U.S. Cl.
CPC ............. *H02J 50/05* (2016.02); *H02J 50/10* (2016.02); *H02J 50/12* (2016.02); *H02J 50/40* (2016.02); *H02J 50/60* (2016.02); *H02J 50/80* (2016.02); *H01M 10/425* (2013.01); *H01M 10/46* (2013.01); *H01M 2010/4278* (2013.01); *H02J 7/00045* (2020.01)

(56) References Cited

U.S. PATENT DOCUMENTS

| 9,627,913 | B2 | 4/2017 | Maugars | |
| 10,461,567 | B2* | 10/2019 | Uramoto | H02J 50/80 |
| 2008/0164839 | A1 | 7/2008 | Kato et al. | |
| 2009/0015197 | A1 | 1/2009 | Sogabe et al. | |
| 2009/0302690 | A1 | 12/2009 | Kubono et al. | |
| 2010/0013320 | A1* | 1/2010 | Shiozaki | H02J 7/00034 |
| | | | | 307/104 |
| 2010/0013322 | A1 | 1/2010 | Sogabe et al. | |
| 2010/0123430 | A1* | 5/2010 | Kojima | H02J 50/70 |
| | | | | 320/108 |
| 2011/0050164 | A1 | 3/2011 | Partovi et al. | |
| 2011/0130093 | A1 | 6/2011 | Walley et al. | |
| 2011/0136550 | A1* | 6/2011 | Maugars | H02J 7/00045 |
| | | | | 455/573 |
| 2011/0177787 | A1 | 7/2011 | Hwang et al. | |
| 2011/0184888 | A1 | 7/2011 | Lee et al. | |
| 2011/0221390 | A1* | 9/2011 | Won | H02J 50/12 |
| | | | | 320/108 |

FOREIGN PATENT DOCUMENTS

| EP | 1 780 863 | A2 | 5/2007 |
| EP | 2 348 604 | A1 | 7/2011 |
| JP | 2001-102974 | A | 4/2001 |
| JP | 2002-034169 | A | 1/2002 |
| JP | 2005-110399 | A | 4/2005 |
| JP | 2007-097331 | A | 4/2007 |
| JP | 2007-124890 | A | 5/2007 |
| JP | 2007-280244 | A | 10/2007 |
| JP | 2008-129865 | A | 6/2008 |
| JP | 2008-206233 | A | 9/2008 |
| JP | 2008-288921 | A | 11/2008 |
| JP | 2010-063245 | A | 3/2010 |
| JP | 2010-268609 | A | 11/2010 |
| JP | 2011-072074 | A | 4/2011 |
| JP | 2011-134049 | A | 7/2011 |
| WO | WO-00/027531 | A1 | 5/2000 |
| WO | WO-2010/131776 | A1 | 11/2010 |
| WO | WO-2011/036863 | A1 | 3/2011 |

OTHER PUBLICATIONS

Japanese Office Action dated Apr. 12, 2016 for corresponding Japanese Application No. 2012-035835.
Extended European Search Report dated Aug. 17, 2015 for corresponding European Application No. 12 821 387.3.
Chinese Office Action dated Sep. 2, 2015 for corresponding Chinese Application No. 201280038268.3.
Extended European Search Report dated Jul. 6, 2018 for corresponding European Application No. 18170876.9.
Extended European Search Report dated Jun. 19, 2020 for corresponding European Application No. 20175640.0.

* cited by examiner

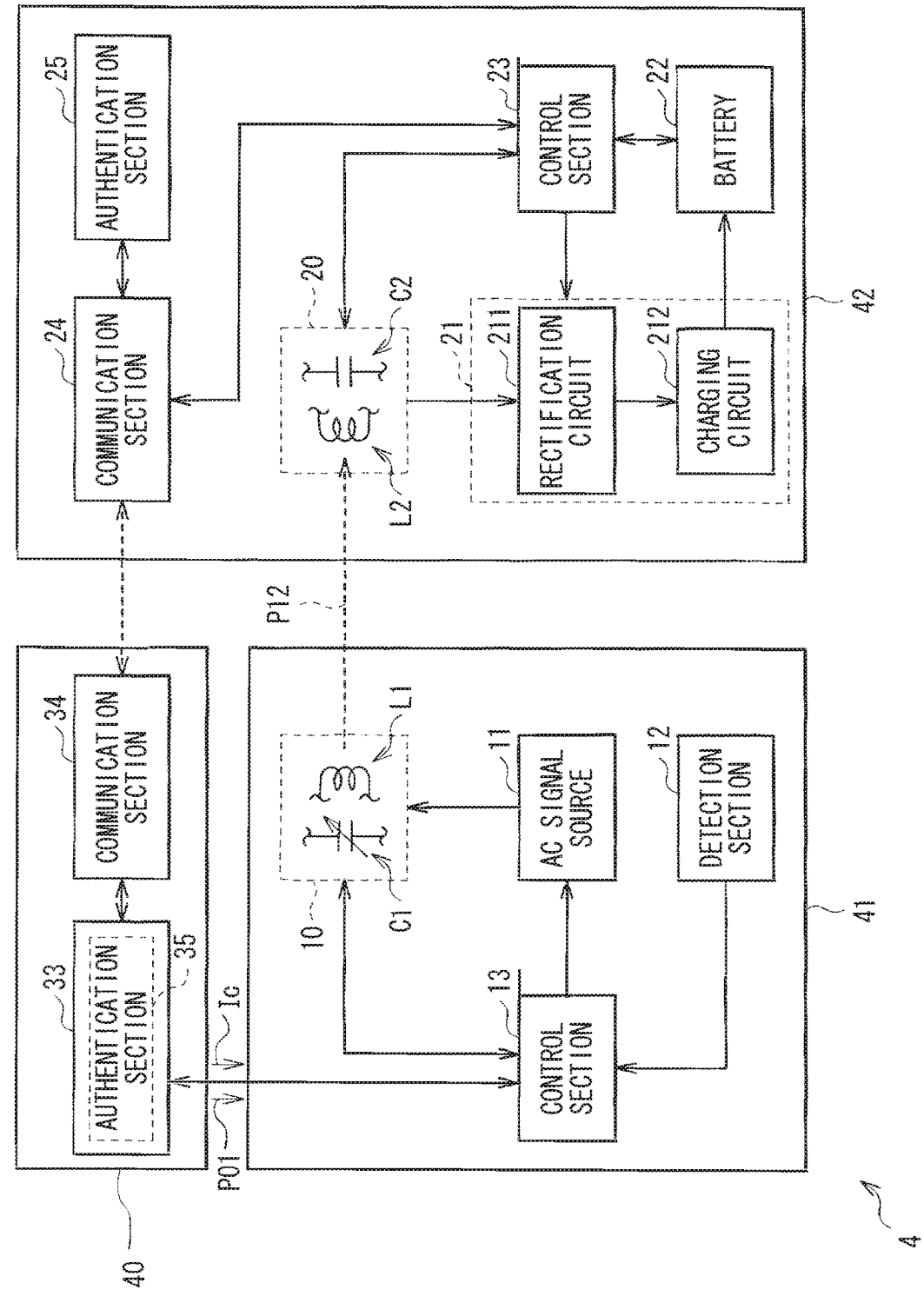
[FIG. 1]

[FIG. 2]
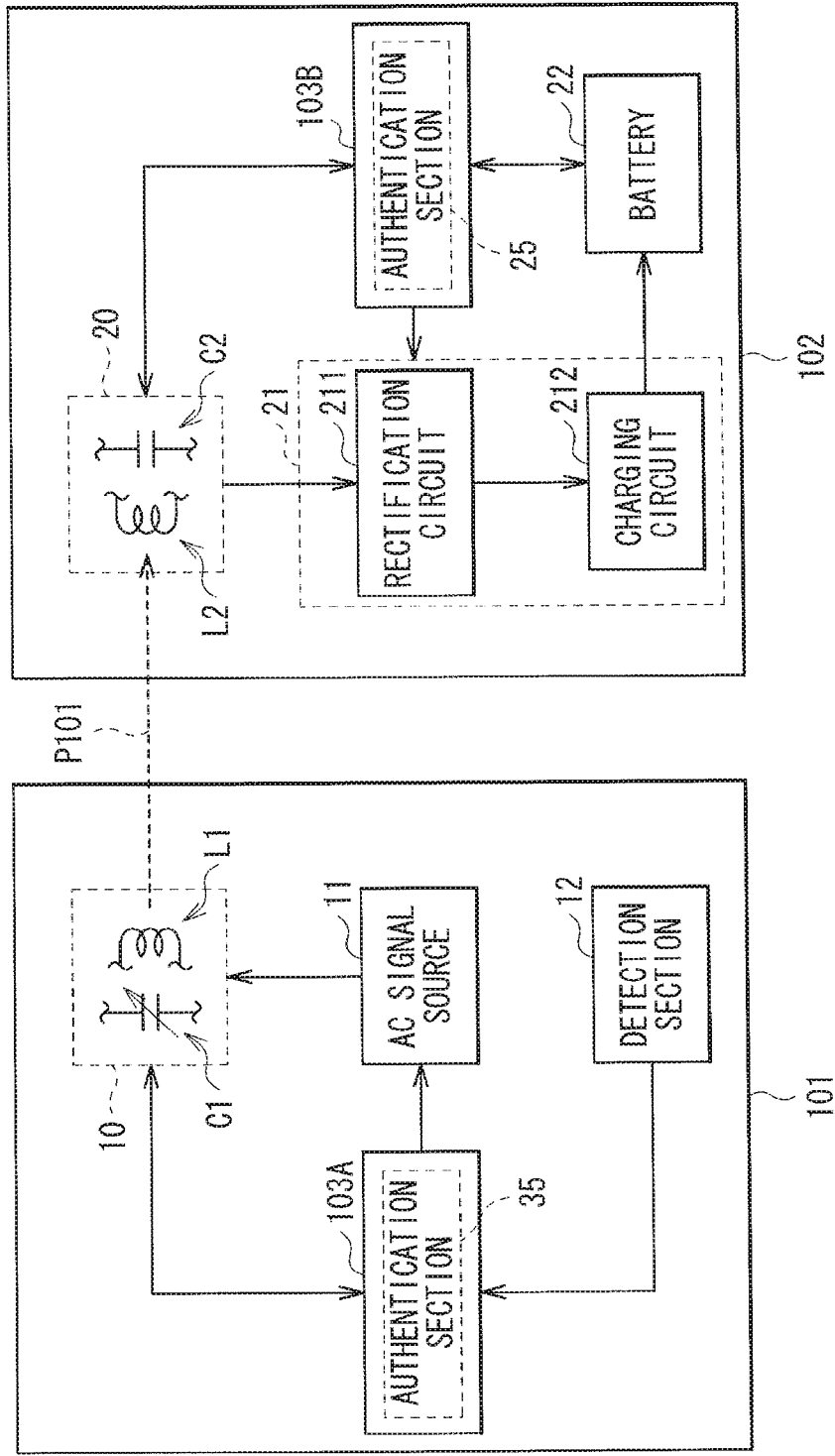

[FIG. 3]
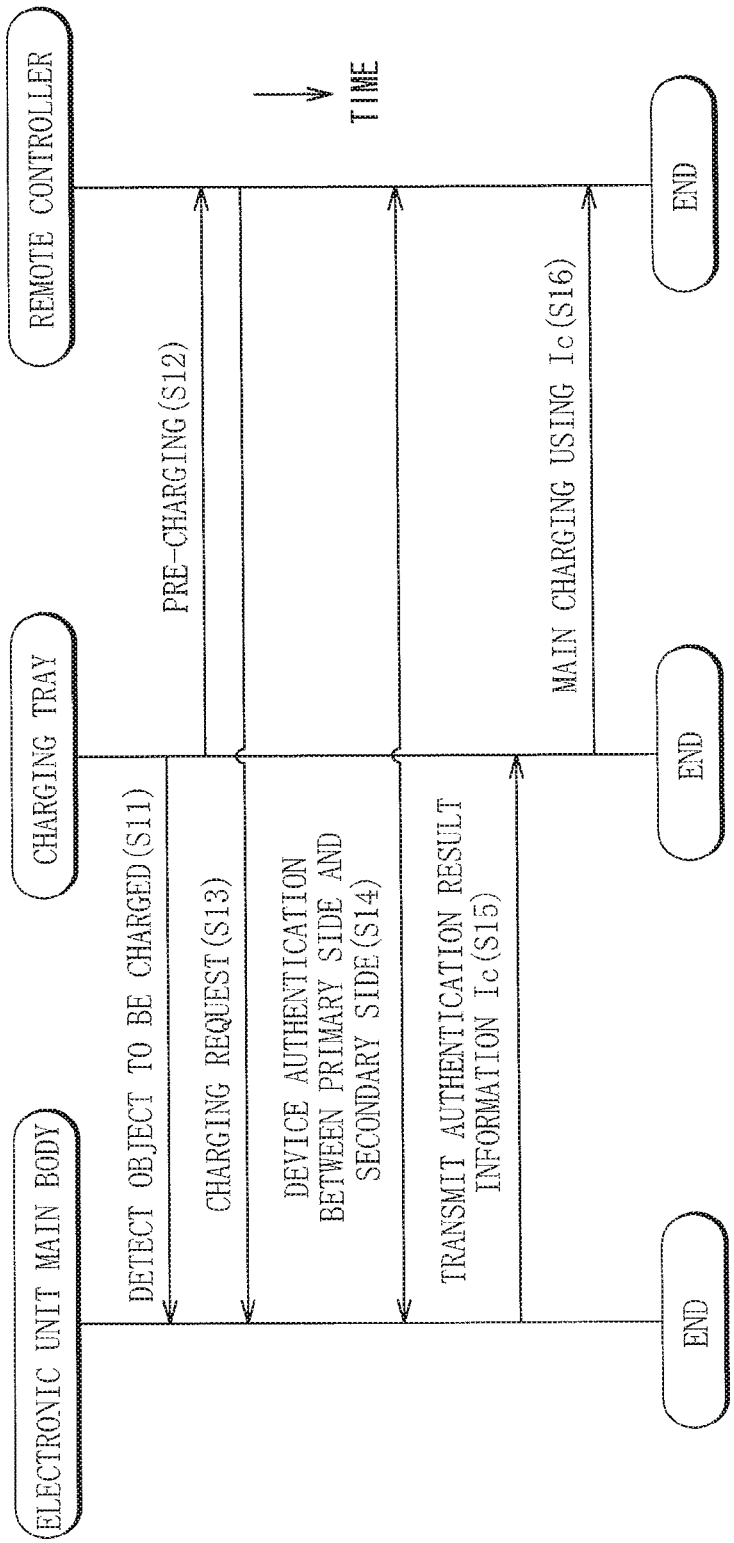

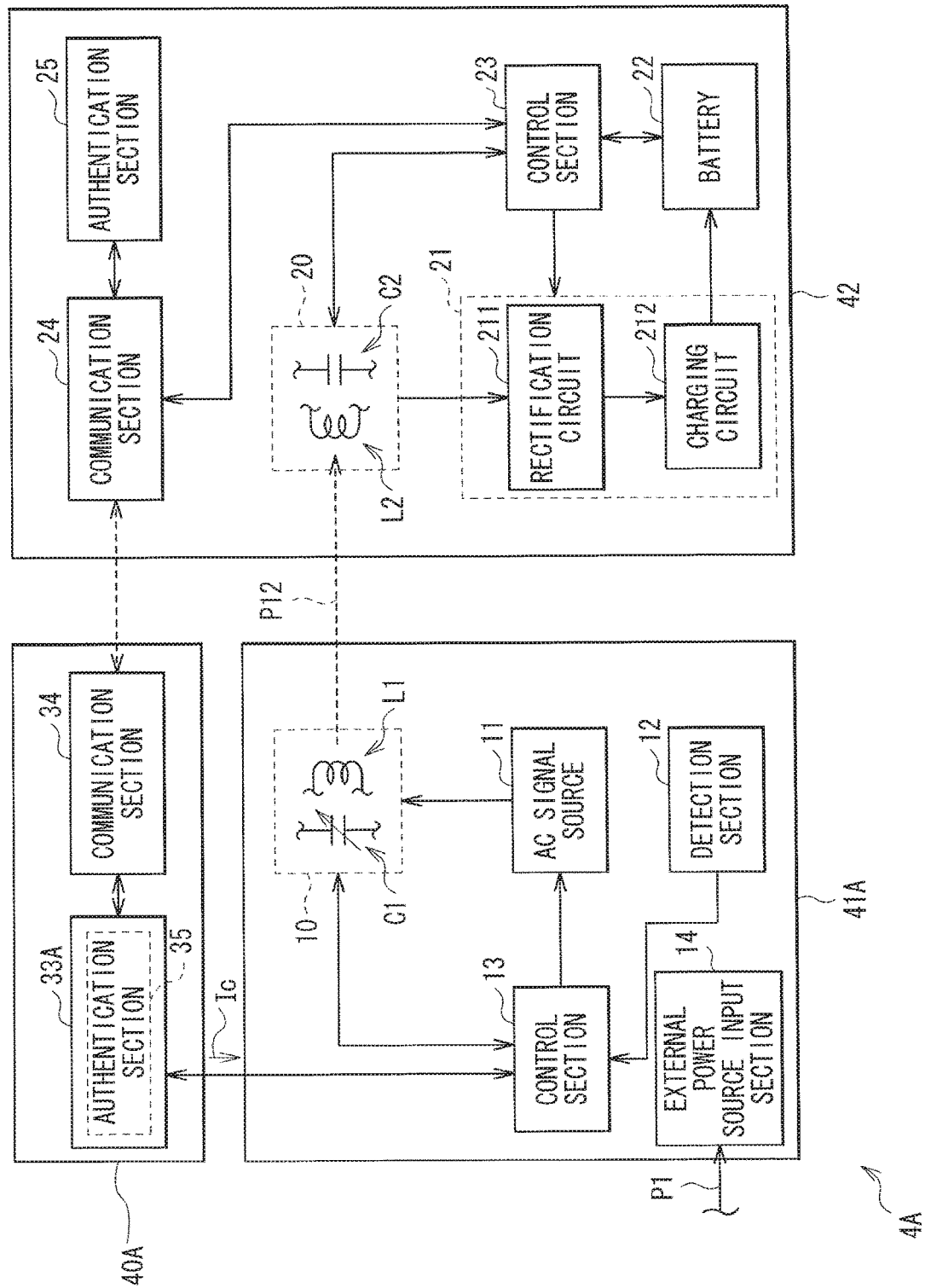
[FIG. 4]

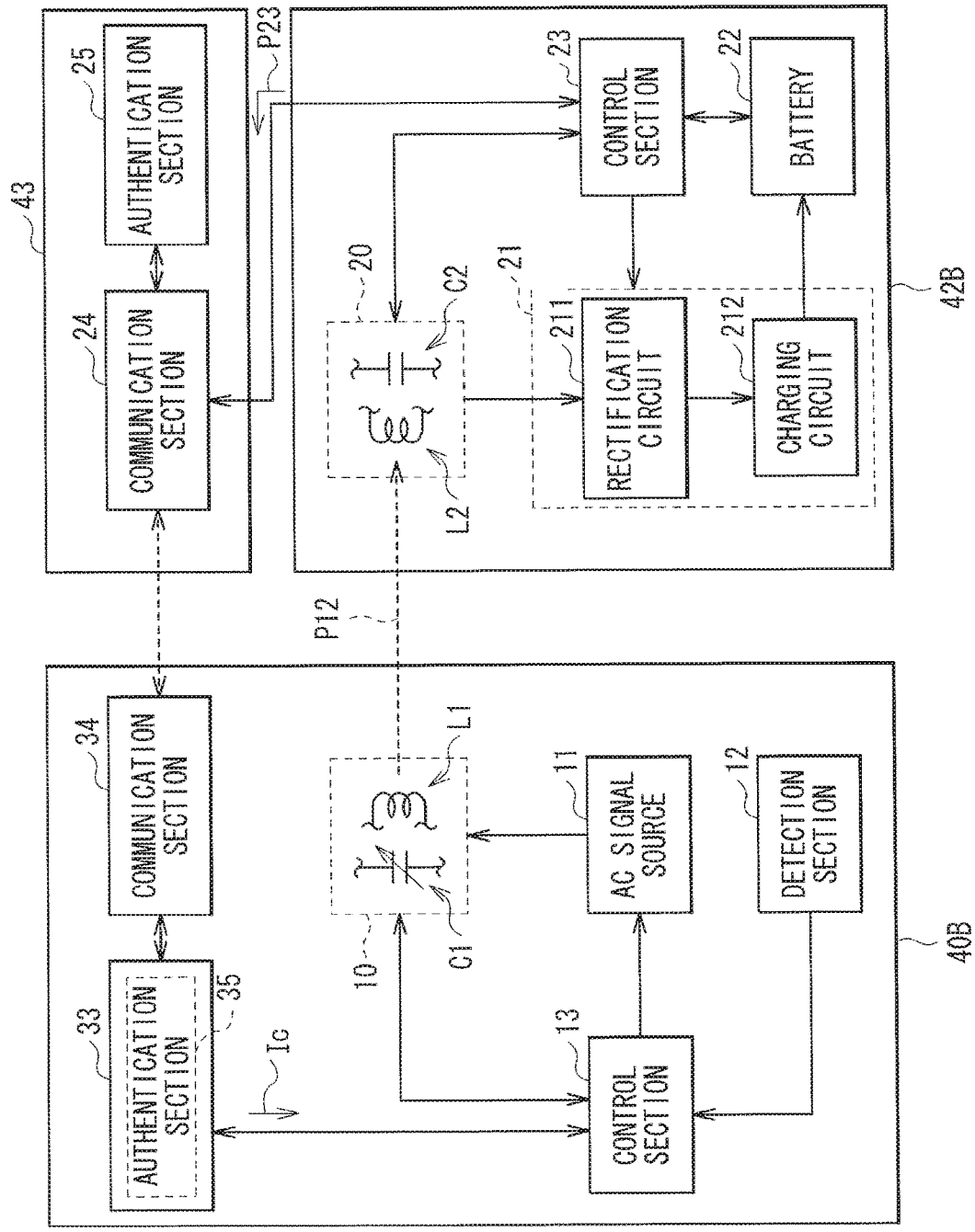
[FIG. 5]

[ FIG. 6 ]
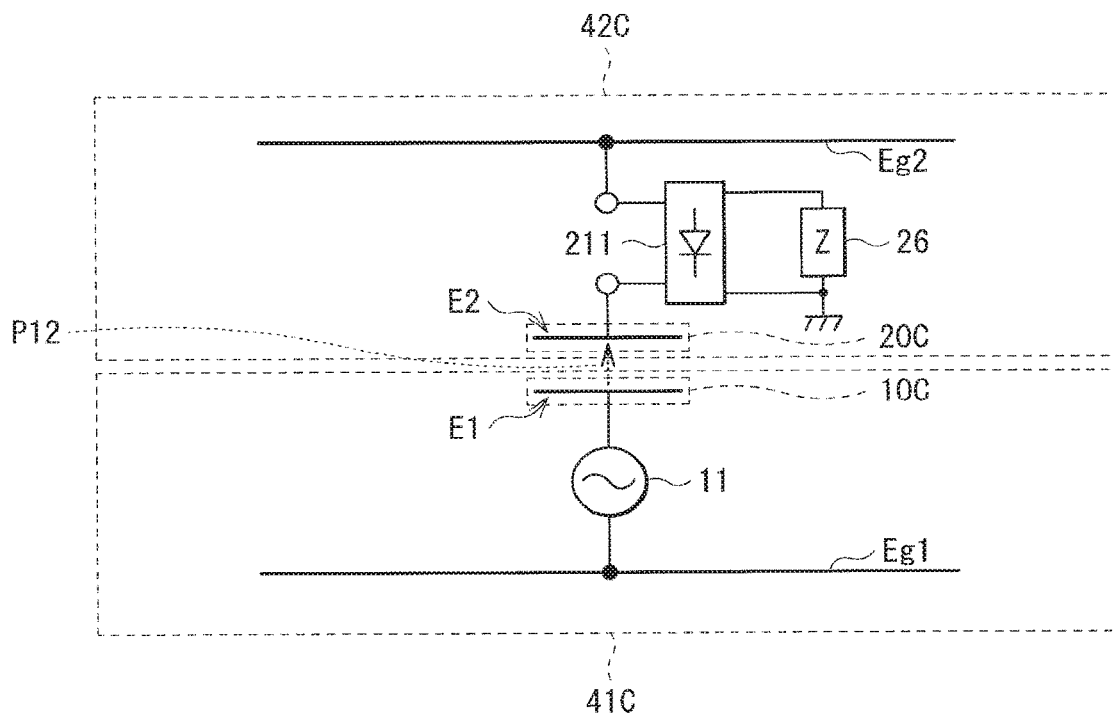
[ FIG. 7 ]
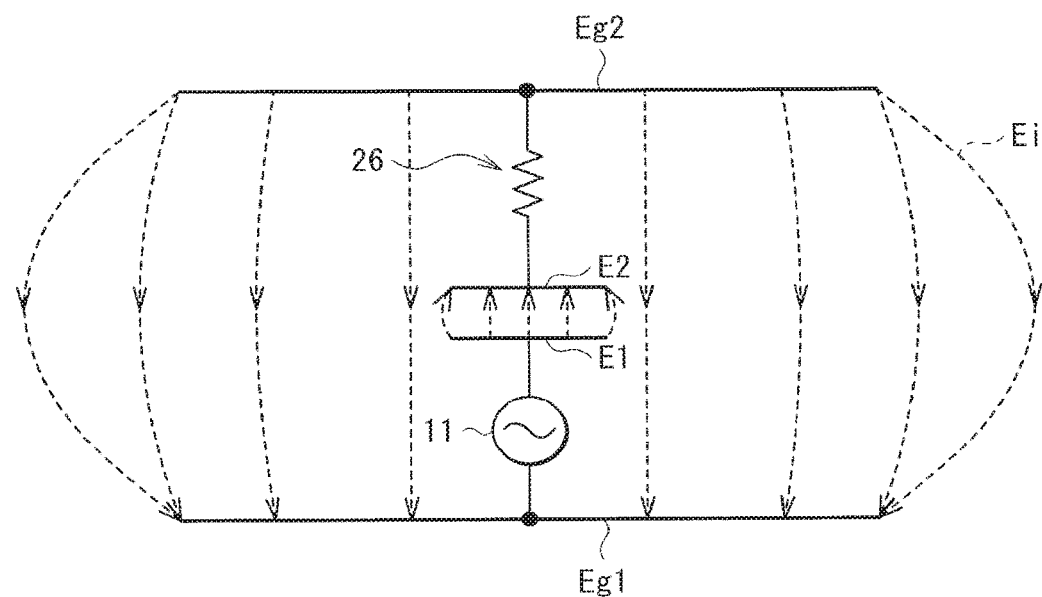

FEED SYSTEM, FEED UNIT, AND ELECTRONIC UNIT

CROSS REFERENCES TO RELATED APPLICATIONS

This application is a Continuation Application of patent application Ser. No. 15/987,296, filed May 23, 2018, which is a Continuation Application of patent application Ser. No. 15/381,792, filed Dec. 16, 2016, now U.S. Pat. No. 10,008,876, issued on Jun. 26, 2018, which is a Continuation Application of patent application Ser. No. 14/130,423, filed Dec. 31, 2013, now U.S. Pat. No. 9,559,524, issued on Jan. 31, 2017, which is a National Stage Entry of Application No.: PCT/JP2012/070588, filed Aug. 7, 2012, which claims priority to Japanese Patent Application Nos.: 2011-175052 and 2012-035835, filed with Japan Patent Office on Aug. 10, 2011 and Feb. 22, 2012 respectively, and, the entire contents of which being incorporated herein by reference.

TECHNICAL FIELD

The present disclosure relates to a feed system including a feed unit which performs non-contact power supply (power transmission) to electronic unit such as mobile phones, and a feed unit and an electronic unit which are applied to such a feed system.

BACKGROUND ART

In recent years, feed units performing non-contact power supply (non-contact charging units, wireless charging units) have attracted attention (for example, Patent Literatures 1 to 6). Such feed units supply power to CE (consumer electronics) devices such as mobile phones and mobile music players, without contact with use of electromagnetic induction and magnetic resonance. Accordingly, charging is allowed to be started by not inserting a connector of a power supply such as an AC adapter into a unit but placing an electronic unit on a tray for charging (charging tray). In other words, terminal connection between the electronic unit and the charging tray is not necessary.

CITATION LIST

Patent Literature

PTL 1: Japanese Unexamined Patent Application Publication No. 2001-102974
PTL 2: International Publication No. WO00/27531
PTL 3: Japanese Unexamined Patent Application Publication No. 2008-206233
PTL 4: Japanese Unexamined Patent Application Publication No. 2002-34169
PTL 5: Japanese Unexamined Patent Application Publication No. 2005-110399
PTL 6: Japanese Unexamined Patent Application Publication No. 2010-63245

SUMMARY OF INVENTION

In order to ensure charging between a feed unit and a proper electronic unit, authentication between the feed unit and the electronic unit is performed in the non-contact power transmission. The feed system in related art, however, provides complicated processes for authentication during the power transmission, and thus the cost is disadvantageously increased.

It is desirable to provide a feed system which is capable of performing authentication between the feed unit and the electronic unit at a low cost when power transmission is performed with use of a magnetic field or an electric field.

According to an embodiment, a feed system includes a first electronic unit, at least one second electronic unit; and a feed unit. The feed unit transmits power to the second electronic units with use of at least one of a magnetic field and an electric field. The first electronic unit and each of the second electronic units communicate with each other and the first electronic unit and the feed unit communicate with each other. Also, the first authentication is performed between the first electronic unit and one of the second electronic units, and the second authentication is performed between the feed unit and one of the second electronic units in conjunction with power transmission.

According to an embodiment, the first electronic unit is separate from the feed unit, and they can be connected using USB. The first electronic unit has a control section managing a number of objects to be charged. Additionally, this control section carries out a proper power distribution function.

According to an embodiment, the second electronic unit communicates with the first electronic unit by either wireless communication or wired communication.

In another embodiment, a feed system includes an electronic unit, an authentication unit that communicates with the electronic unit, and a power reception unit that receives power from the electronic unit. The first authentication is performed between the electronic unit and the authentication unit. Then, the electronic unit performs a power transmission and the second authentication based upon the result information of the first authentication.

In another embodiment, the authentication unit is separate from the power reception unit.

BRIEF DESCRIPTION OF DRAWINGS

FIG. 1 is a block diagram illustrating an overall configuration example of a feed system according to an embodiment of the disclosure.

FIG. 2 is a block diagram illustrating an overall configuration example of a feed system according to a comparative example.

FIG. 3 is a flowchart illustrating an example of charging operation in the feed system illustrated in FIG. 1.

FIG. 4 is a block diagram illustrating an overall configuration example of a feed system according to a modification 1.

FIG. 5 is a block diagram illustrating an overall configuration example of a feed system according to a modification 2.

FIG. 6 is a block diagram illustrating a schematic configuration example of a feed system according to another modification.

FIG. 7 is a schematic diagram illustrating a propagation mode example of an electric field in the feed system illustrated in FIG. 6.

DESCRIPTION OF EMBODIMENTS

An embodiment of the present disclosure will be described below referring to the accompanying drawings. Note that descriptions will be given in the following order.

1. Embodiment (an example in a case where power is supplied from a zeroth-side unit to a primary-side unit)
2. Modifications
   Modification 1 (an example in a case where a primary-side unit is supplied with power from the outside)
   Modification 2 (an example in a case where a secondary-side unit is separated to a power reception unit and an authentication unit, and a zeroth-side unit and a primary-side unit are integrated)
3. Other modifications (an example of a feed system performing non-contact power transmission with use of an electric field, and the like)

Embodiment

[Configuration of Feed System 4]

FIG. 1 is a block diagram illustrating an overall configuration of a feed system (a feed system 4) according to an embodiment of the disclosure. The feed system 4 is a system performing non-contact power transmission (power supply, power feeding) with use of a magnetic field (with use of electromagnetic induction, magnetic resonance, and the like; hereinafter the same). The feed system 4 includes an electronic unit main body 40 (a first electronic unit, another electronic unit, a zeroth-side unit), a charging tray 41 (a feed unit, a primary-side unit), and a remote controller 42 (a second electronic unit, an electronic unit, a remote control unit, a secondary-side unit). In the feed system 4, as will be described later, power is transmitted from the charging tray 41 to the remote controller 42 by placing (or closely disposing) the remote controller 42 on the charging tray 41. In other words, the feed system 4 is a non-contact feed system.

(Electronic Unit Main Body 40)

The electronic unit main body 40 is a main body part of an electronic unit such as a TV apparatus (television receiver), an image read/write apparatus, and a game machine, and includes a control section 33 and a communication section 34.

The communication section 34 performs a predetermined communication described later (remote control to the electronic unit main body 40, and the like) with the remote controller 42 (specifically, a communication section 24 described later). Accordingly, communication is allowed to be performed between the electronic unit main body 40 and the remote controller 42.

The control section 33 controls operation of the entire electronic unit main body 40, and is configured of a microcomputer, for example. The control section 33 includes an authentication section 35 performing mutual unit authentication (first authentication) between the electronic unit main body 40 and the remote controller 42. The first authentication by the authentication section 35 (and an authentication section 25 in the remote controller 42, described later) will be described in detail later.

Note that the control section 33 may have the following other functions, for example, in addition to the above-described unit authentication function. For example, the control section 33 may have a control function of data communication between the charging tray 41 and the remote controller 42, a management function of the number of objects to be charged and a control function of charging (a proper power distribution function) when the charging tray 41 covers a plurality of objects to be charged.

(Charging Tray 41)

As described above, the charging tray 41 is a feed unit transmitting power to the remote controller 42 with use of a magnetic field, and is capable of performing mutual communication with the electronic unit main body 40. The charging tray 41 includes a power transmission section 10, an AC signal source 11, a detection section 12, and a control section 13. In addition, the charging tray 41 is supplied with power (power P01) from the electronic unit main body 40. In other words, the electronic unit main body 40 supplies power to the charging tray 41, in addition to authentication result information Ic which will be described later.

The power transmission section 10 includes a coil (a primary-side coil) L1 and a capacitor element (variable capacity element) C1. The power transmission section 10 uses the coil L1 and the capacitor element C1 to transmit power to the remote controller 42 (specifically, a power reception section 20 described later) with use of a magnetic field. To be more specific, the power transmission section 10 has a function of radiating a magnetic field (magnetic flux) toward the remote controller 42. Incidentally, the power transmission section 10 may perform transmission/reception of a predetermined signal with the remote controller 42.

The AC signal source 11 includes, for example, an AC power source, an oscillator, and an amplifier circuit, and is a signal source supplying a predetermined AC signal for power transmission to the coil L1 and the capacitor element C1 in the power transmission section 10.

The detection section 12 detects, for example, a foreign metal and the like on the charging tray 41, or detects a temperature (ambient temperature), pressure (ambient pressure), and the like around the charging tray 41. Accordingly, an object is detectable with use of the change of the ambient pressure, excessive temperature rise of a foreign metal and the like is avoidable, and power transmission according to the ambient temperature is allowed to be performed.

The control section 13 controls operation of the entire charging tray 41, and is configured of a microcomputer, for example. The control section 13 has a function to perform mutual communication with the control section 33 in the electronic unit main body 40, and is capable of receiving, from the electronic unit main body 40, the authentication result information Ic as an authentication result of the above-described first authentication (mutual unit authentication between the electronic unit main body 40 and the remote controller 42). Then, the control section 13 uses the received authentication result information Ic to perform unit authentication (mutual unit authentication between the charging tray 41 and the remote controller 42; second authentication) in power transmission from the charging tray 41 to the remote controller 42. In other words, such second authentication in the power transmission is performed through the electronic unit main body 40. Note that the detail of the second authentication performed by the control section 13 will be described later.

(Remote Controller 42)

The remote controller 42 is a unit performing remote control to the electronic unit main body 40, and includes a power reception section 20, a charging section 21, a battery 22, a control section 23, the communication section 24, and the authentication section 25.

The power reception section 20 includes a coil (a secondary-side coil) L2 and a capacitor element C2. The power reception section 20 has a function to receive power transmitted from the power transmission section 10 in the charging tray 41 with use of the coil L2 and the capacitor element C2. Note that the power reception section 20 may perform transmission/reception of a predetermined signal with the charging tray 41.

The charging section 21 includes a rectification circuit 211 and a charging circuit 212, and performs charging operation to the battery 22 based on the power (AC power) received by the power reception section 20. Specifically, the rectification circuit 211 is a circuit which rectifies the AC power supplied from the power reception section 20, and generates DC power. The charging circuit 212 is a circuit which performs charging to the battery 22 based on the DC power supplied from the rectification circuit 211.

The battery 22 stores power in response to charging by the charging circuit 212, and is configured with use of a secondary battery such as a lithium ion battery.

The communication section 24 performs predetermined communication (remote control to the electronic unit main body 40, or the like) with the electronic unit main body 40 (the communication section 34). Accordingly, mutual communication between the remote controller 42 and the electronic unit main body 40 is allowed to be performed. Incidentally, although the case where the communication between the communication sections 24 and 34 (remote control from the remote controller 42 to the electronic unit main body 40, or the like) is performed by wireless (for example, infrared rays) is exemplified herein, such communication (remote control) may be wired communication. In this case, examples of the wireless communication by using other than infrared rays include Bluetooth (registered trademark), WiFi (registered trademark), ZigBee (registered trademark), and FeliCa (registered trademark). Alternatively, data may be superimposed (modulated) on magnetic field lines (a magnetic field) which supply power. On the other hand, examples of the wired communication include USB (universal serial bus) and Ethernet (registered trademark). In addition, the communication between the communication sections 24 and 34 is desirably bidirectional communication, but may be unidirectional (one-way) communication (only communication from the remote controller 42 to the electronic unit main body 40).

The authentication section 25 performs the above-described first authentication (mutual unit authentication between the electronic unit main body 40 and the remote controller 42). Incidentally, the detail of the first authentication performed by the authentication section 25 (and the above-described authentication section 35) will be described later.

The control section 23 controls operation of the entire remote controller 42, and is configured of a microcomputer, for example. Specifically, the control section 23 controls operations of the power reception section 20, the charging section 21, the battery 22, the communication section 24, and the authentication section 25.

[Functions and Effects of Feed System 4]

Subsequently, functions and effects of the feed system 4 according to the embodiment will be described.

(1. Outline of Overall Operation)

(Charging Operation from Charging Tray 41 to Remote Controller 42)

In the charging tray 41 of the feed system 4, the AC signal source 11 supplies a predetermined AC signal for power transmission to the coil L1 and the capacitor element C1 in the power transmission section 10, in response to the control by the control section 13. Accordingly, a magnetic field (magnetic flux) is generated in the coil L1 in the power transmission section 10. At this time, when the remote controller 42 is placed (or closely disposed) as an object to be fed with power (object to be charged) on an upper surface (a power transmission surface) of the charging tray 41, the coil L1 in the charging tray 41 and the coil L2 in the remote controller 42 become close to each other near the upper surface of the charging tray 41.

In this way, when the coil L2 is disposed closely to the coil L1 generating the magnetic field (magnetic flux), electromotive force is generated in the coil L2 by induction of the magnetic flux generated from the coil L1. In other words, interlinkage magnetic field is generated in each of the coil L1 and the coil L2 due to electromagnetic induction or magnetic resonance. Accordingly, power is transmitted from the coil L1 side (primary side, charging tray 41 side, power transmission 10 side) to the coil L2 side (secondary side, remote controller 42 side, power reception section 20 side) (refer to power P12 illustrated in FIG. 1).

Then, In the remote controller 42, the AC power received by the coil L2 is supplied to the charging section 21, and the following charging operation is performed. Specifically, after the AC power is converted in to predetermined DC power by the rectification circuit 211, the battery 22 is charged by the charging circuit 212, based on the DC power. In this way, in the remote controller 42, charging operation based on the power received by the power reception section 20 is performed.

In other words, in the embodiment, when the remote controller 42 is charged, terminal connection to an AC adapter or the like is not necessary, and charging is easily started (non-contact charging is performed) by only placing (or closely disposing) the remote controller 42 on the upper surface of the charging tray 41. This leads to liability relief of a user.

(Inter-Unit Authentication between Electronic Unit Main Body 40 and Remote Controller 42; First Authentication)

In the feed system 4, inter-unit authentication (first authentication) for mutual authentication is also performed between the electronic unit main body 40 and the remote controller 42. Specifically, the authentication sections 25 and 35 each have ID (identification) information for authenticating (identifying) the counterpart, and such inter-unit authentication is performed by exchanging the ID information by communication through the communication sections 24 and 34.

Whether the remote controller 42 is a proper unit as a remote control unit to the electronic unit main body 40 (whether the remote controller 42 is improper or not) is determined through the first authentication. As a result, safety (higher security) communication (remote control) is achievable between the electronic unit main body 40 and the remote controller 42.

(2. Inter-Unit Authentication in Charging Operation; Second Authentication)

In a non-contact feed system including a feed unit and an electronic unit, inter-unit authentication (second authentication) is performed between the feed unit and the electronic unit in non-contact power transmission in some cases. This is because of the following reasons, for example. First, charging is performed between a proper feed unit and an electronic unit by eliminating improper units. In other words, the battery (for example, a secondary battery) in the electronic unit as an object to be charged needs product management of the feed unit (authentication whether the feed unit is proper or not) because the battery is damaged by excessive power supply because of its property. In addition, if larger power is supplied from the feed unit, it is expected that charging time is reduced and convenience is improved. However, the inter-unit authentication is necessary in terms of safety, regulations, and the like.

COMPARATIVE EXAMPLE

FIG. 2 is a block diagram illustrating an overall configuration of a feed system (a feed system 104) according to a comparative example. Similar to the feed system 4, the feed system 104 in the comparative example is a system performing non-contact power transmission with use of a magnetic field, and includes a charging tray 101 as a feed unit and an electronic unit 102 as an object to be fed with power.

The charging tray 101 corresponds to the charging tray 41 provided with a control section 103A in place of the control section 13 illustrated in FIG. 1, and the other configuration is similar to that in the embodiment. The control section 103A includes the authentication section 35 performing inter-unit authentication (second authentication) between the charging tray 101 and the electronic unit 102 in the power transmission.

The electronic unit 102 corresponds to an electronic unit obtained by eliminating (not providing) the communication section 24 and the authentication section 25, and providing a control section 103B in place of the control section 23, in the remote controller 42 illustrated in FIG. 1. The other configurations are similar to those in the embodiment. The control section 103B includes the authentication section 25 performing the above-described second authentication with the authentication section 35 in the power transmission.

In the feed system 104 with such a configuration, non-contact power transmission (charging operation) is performed from the charging tray 101 to the electronic unit 102 (refer to power P101 illustrated in FIG. 2), similarly to the feed system 4. In addition, in such power transmission, unit authentication (second authentication) between the charging tray 101 and the electronic unit 102 is performed. Specifically, the authentication sections 25 and 35 each have the above-described ID information, for example, and the ID information is exchanged by signal transmission/reception between the power transmission section 10 and the power reception section 20 in the power transmission, and thus such inter-unit authentication is performed. Accordingly, safety (high security) power transmission (charging operation) is achievable between the charging tray 101 and the electronic unit 102.

However, in the feed system 104 of the comparative example, a function to achieve the second authentication (the authentication sections 25 and 35) needs to be provided inside the charging tray 101 and the electronic unit 102 (herein, in the control sections 103A and 103B). Therefore, the following disadvantages occur. Specifically, in a typical feed system not having a function to perform the second authentication, complicated processes for the second authentication need to be provided so that manufacturing cost is increased and development of the production takes a long time.

Embodiment

Accordingly, in the feed system 4 of the embodiment, the inter-unit authentication (the second authentication) between the charging tray 41 and the remote controller 42 in the power transmission is performed through the electronic unit main body 40. Specifically, as illustrated in FIG. 1, the charging tray 41 (the control section 13) first receives, from the electronic unit main body 40, the authentication result information Ic as the authentication result of the inter-unit authentication (the first authentication) between the electronic unit main body 40 and the remote controller 42. Then, the charging tray 41 (the control section 13) uses the authentication result information Ic to perform the above-described second authentication. As a result, with use of the authentication result (existing authentication result) of the first authentication, the second authentication is easily achieved compared with the comparative example described above.

FIG. 3 illustrates an example of charging operation in the feed system 4, with use of a flowchart illustrating operations between the electronic unit main body 40, the charging tray 41, and the remote controller 42 in time series.

In the charging operation of the embodiment, first, when the remote controller 42 is placed (or closely disposed) on the charging tray 41, the detection section 12 in the charging tray 41 detects an object to be charged (herein, the remote controller 42) (step S11 in FIG. 3). Then, before the second authentication described later, pre-charging is performed from the charging tray 41 to the remote controller 42 (step S12). The pre-charging is an operation previously supplying power necessary in the remote controller 42 during the charging request and the first authentication (both described later), before main charging which will be described later. Incidentally, during the pre-charging, the charging tray 41 is desirably informed of information such as necessary power amount and current operation state in advance through the electronic unit main body 40 by performing communication from the remote controller 42 (the communication section 24) to the electronic unit main body 40 (the communication section 34).

Subsequently, the remote controller 42 performs communication with the electronic unit main body 40 to perform charging request (of the main charging) (step S13). Then, the inter-unit authentication (the first authentication) is performed between the electronic unit main body 40 (the primary-side unit) and the remote controller 42 (the secondary-side unit) by the above-described technique (step S14).

After that, the electronic unit main body 40 (the authentication section 35 in the control section 33) transmits, to the charging tray 41 (the control section 13), the authentication result information Ic as the authentication result of the above-described first authentication (step S15). Then, the charging tray 41 (the control section 13) uses the transmitted authentication result information Ic to perform power transmission (main charging) from the charging tray 41 to the remote controller 42 (step S16). Specifically, the control section 13 determines that the object to be charged is a proper unit when the units are properly (normally) authenticated to each other by the exchange of the above-described ID information, for example, and then controls the main charging to be started (continued). In this way, the charging operation illustrated in FIG. 3 is ended.

As described above, in the embodiment, when the power is transmitted from the charging tray 41 to the remote controller 42 with use of the magnetic field, the inter-unit authentication (the second authentication) between the charging tray 41 and the remote controller 42 is performed through the electronic unit main body 40, and therefore, the second authentication is easily achievable. Accordingly, for example, when a non-contact charging function is introduced in an existing feed system, the existing function (a function of performing the inter-unit authentication (first authentication) between the electronic unit main body 40 and the remote controller 42) is effectively utilized, and the non-contact charging function is allowed to be introduced speedily at a relatively low cost. Therefore, authentication between units is allowed to be performed at a low cost in the power transmission with use of the magnetic field.

In addition, since the electronic unit main body 40 supplies power in addition to the authentication result information Ic to the charging tray 41, an input function of an external power source is not necessarily provided on the charging tray 41, unlike a modification 1 described below.

Furthermore, in the power transmission, the charging tray 41 performs pre-charging of the remote controller 42 before the above-described second authentication and performs the main charging of the remote controller 42 after the second authentication. Consequently, appropriate charging operation is allowed to be performed in consideration of the remaining power, the operation state, and the like of the remote controller 42.

[Modifications]

Subsequently, modifications (modifications 1 and 2) of the above-described embodiment are described. Note that like numerals are used to designate substantially like components in the above-described embodiment, and the description thereof is appropriately omitted.

[Modification 1]

FIG. 4 is a block diagram illustrating an overall configuration of a feed system (a feed system 4A) according to the modification 1. The feed system 4A of the modification 1 includes an electronic unit main body 40A (a first electronic unit, a zeroth-side unit), a charging tray 41A (a feed unit, a primary-side unit), and the remote controller 42. In other words, the feed system 4A has the electronic unit main body 40A and the charging tray 41A in place of the electronic unit main body 40 and the charging tray 41 of the feed system 4 according to the above-described embodiment.

The electronic unit main body 40A is provided with a control section 33A in place of the control section 33 of the electronic unit main body 40, and the other configurations are similar to those in the embodiment. Unlike the control section 33, the control section 33A does not have a function of supplying power from the electronic unit main body 40A to the charging tray 41A.

The charging tray 41A is configured by adding an external power source input section 14 to the charging tray 41, and the other configurations are similar to those in the embodiment. The external power source input section 14 receives power necessary for operating the charging tray 41A from the outside, and includes, for example, a power plug. In other words, the charging tray 41A of the modification is supplied with power from the outside instead of the electronic unit main body 40 (refer to power P1 illustrated in FIG. 4).

Also in the modification 1, effects similar to those in the above-described embodiment are basically obtainable by the functions similar to those in the embodiment.

[Modification 2]

FIG. 5 is a block diagram illustrating an overall configuration of a feed system (a feed system 4B) according to the modification 2. The feed system 4B of the modification 2 includes an electronic unit main body 40B with a charging function (a first electronic unit and a feed unit, a zeroth-side unit and a primary-side unit), a power reception unit 42B (a secondary-side unit), and an authentication unit 43 (a remote control unit, a tertiary-side unit). In other words, the feed system 4B is configured by providing the electronic unit main body 40B with a charging function in place of the electronic unit main body 40 and the charging tray 41, and providing the power reception unit 42B and the authentication unit 43, in place of the remote controller 42, in the feed system 4 according to the above-described embodiment.

The electronic unit main body 40B with a charging function includes the power transmission section 10, the AC signal source 11, the detection section 12, the control section 13, the control section 33, and the communication section 34. Specifically, the electronic unit main body 40B with a charging function according to the modification 2 is configured by integrating functions of the electronic unit main body 40 and the charging tray 41 described above (integrating the zeroth-side unit and the primary-side unit). In other words, in the electronic unit main body 40B with a charging function, the electronic unit main body 40 and the charging tray 41 are integrated.

The power reception unit 42B is configured by omitting the communication section 24 and the authentication section 25 from the remote controller 42, and the other configurations are similar to those in the embodiment. On the other hand, the authentication section 43 includes the communication section 24 and the authentication section 25 of the remote controller 42.

Specifically, in the modification 2, a power reception function section (the power reception section 20, the charging section 21, the battery 22, and the control section 23) and an authentication function section (the communication section 24 and the authentication section 25) of the remote controller 42 (the secondary-side unit) are separated to the power reception unit 42B and the authentication unit 43, respectively. In other words, the remote controller 42 according to the above-described embodiment is separated into the power reception unit 42B for performing power reception operation in the power transmission and the authentication unit 43 for performing the above-described first authentication. Incidentally, in the modification 2, power is supplied from the power reception unit 42B (the control section 23) to the authentication unit 43 (the communication section 24) due to the division (refer to power P23 illustrated in FIG. 5).

Also in the modification 2, effects similar to those in the above-described embodiment are basically obtainable by the functions similar to those in the embodiment.

[Other Modifications]

Hereinbefore, although the technology of the present disclosure has been described with referring to the embodiment and the modifications, the technology is not limited to the embodiment and the like, and various modifications may be made.

For example, in the above-described embodiment and the like, although the authentication operation between units has been specifically described as an example, the technique of the authentication operation is not limited thereto, and the other technique is also available.

In addition, in the above-described embodiment and the like, although the components of each of the electronic unit main body, the charging tray, the remote controller, and the like have been specifically described, all the components are not necessarily provided and the other components may be further provided.

Furthermore, in the above-described embodiment and the like, the case where only one electronic unit (the second electronic unit) is provided as an object to be fed with power in the feed system has been described, however, this is not limitative. In other words, the feed system of the disclosure is applicable to the case where a plurality of (two or more) electronic units is provided as objects to be fed with power.

Additionally, in the above-described embodiment and the like, the charging tray used in a small electronic unit (CE unit) such as a mobile phone has been described as an example of the feed unit. However, the feed unit is not limited to the charging tray used at home, and is applicable to a charger in various electronic units. Moreover, the charging tray is not necessarily configured as a tray, and may be a stand for an electronic unit, such as a so-called cradle.

(Example of Feed System Performing Non-Contact Power Transmission with Use of Magnetic Field)

In the above-described embodiment and the like, the feed system performing non-contact power transmission (power feeding) from the feed unit (the charging tray) as the primary-side unit to the second electronic unit (the remote controller) as the secondary-side unit with use of the magnetic field has been described as an example, however, the feed system is not limited thereto. In other words, the subject matter of the disclosure is applicable to a feed system performing non-contact power transmission from a feed unit as a primary-side unit to a second electronic unit as a secondary-side unit with use of an electric field (electric field coupling), and effects similar to those in the above-described embodiment and the like are obtainable in this application.

Specifically, a feed system illustrated in FIG. 6 includes a feed unit 41C (a primary-side unit, a charging tray) and a second electronic unit 42C (a secondary-side unit, a remote controller). In FIG. 6, an electronic unit main body (a first electronic unit) is omitted in illustration. The feed unit 41C mainly includes a power transmission section 10C including a power transmission electrode E1 (a primary-side electrode), an AC signal source 11 (an oscillator), and a ground electrode Eg1. The second electronic unit 42C mainly includes a power reception section 20C including a power reception electrode E2 (a secondary-side electrode), the rectification circuit 211, a load 26, and a ground electrode Eg2. Specifically, the feed system includes two pairs of electrodes, the power transmission electrode E1 and the power reception electrode E2, and the ground electrodes Eg1 and Eg2. In other words, the feed unit 41C (the primary-side unit) and the second electronic unit 42C (the secondary-side unit) each have an antenna configured of a pair of asymmetrical electrodes such as a monopole antenna inside thereof.

In the feed system with such a configuration, when the power transmission electrode E1 and the power reception electrode E2 face each other, the above-described non-contact type antennae are coupled with each other (are coupled with an electric field with each other along a vertical direction of the electrodes). Then, an induced electric field is generated between the antennae, and the power transmission with use of the electric field is performed accordingly (refer to power P12 illustrated in FIG. 6). Specifically, as schematically illustrated in FIG. 7, for example, the generated electric field (induced electric field Ei) propagates from the power transmission electrode E1 side toward the power reception electrode E2 side, and the generated induced electric field Ei propagates from the ground electrode Eg2 side toward the ground electrode Eg1 side. In other words, a loop path of the generated induced electric field Ei is formed between the primary-side unit and the secondary-side unit. Also in the non-contact power supplying system with use of such an electric field, effects similar to those in the above-described embodiment and the like are obtainable by applying the technique similar to that in the embodiment and the like.

A method of a charging operation in a feed system including a first electronic unit, a second electronic unit configured to communicate with the first electronic unit, and a feed unit configured to transmit power to the second electronic unit, including receiving, from the second electronic unit, a charging request to the first electronic unit in conjunction with the second electronic unit being in proximity to the feed unit; carrying out a first authentication between the first electronic unit and the second electronic unit; transmitting result information of the first authentication from the first electronic unit to the feed unit; and performing power transmission from the feed unit to the second electronic unit using the result information of the first authentication. Additionally, the method of the charging operation in the feed system further includes detecting, by a detection section in the feed unit, an object to be charged, such as the second electronic unit. Also, the performing power transmission further comprises authenticating the second electronic unit.

One embodiment of a feed system includes a first electronic unit configured for communication with a second electronic unit; and a feed unit configured to transmit power to a power reception section of the second electronic unit based upon result information of a first authentication between the first electronic unit and the second electronic unit. The first the first electronic unit in this feed system is separate from the feed unit. A detection section in this feed unit detects an object to be charged, such as the second electronic unit. Also, this feed unit performs a second authentication on the second electronic unit in conjunction with power transmission. The first electronic unit is configured to supply power to the feed unit, and the feed unit and the first electronic unit are connected using USB. In this embodiment, the feed unit includes an external power source input section configured to receive power from a source external to the feed system. Additionally, the first electronic unit comprises a control section configured to manage a number of objects to be charged. The first electronic unit comprises a control section configured to carry out a control function of charging. The first electronic unit comprises a control section configured to carry out a proper power distribution function. The second electronic unit is configured to communicate with the first electronic unit by one of wireless communication and wired communication. The wireless communication comprises Bluetooth, WiFi, ZigBee, and FeliCa, and the wired communication comprises USB and Ethernet. The first electronic unit comprises one of a television receiver, an image read/write apparatus, and a game machine. The feed unit is configured to transmit power to the second electronic unit with use of at least one of a magnetic field and an electric field coupling.

The present disclosure contains subject matter related to that disclosed in Japanese Priority Patent Application JP 2011-175052 filed in the Japan Patent Office on Aug. 10, 2011 and Japanese Priority Patent Application JP 2012-035835 filed in the Japan Patent Office on Feb. 22, 2012, the entire content of which is hereby incorporated by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. A power reception unit comprising:
  a power reception section that is configured to receive, during pre-charging that is performed after the power reception unit is detected, wireless power;
  a communication section that is configured to perform communication with an electronic unit; and
  a control section that is configured to:
    control the communication section,
    perform first authentication between the power reception unit and the electronic unit, and
    perform second authentication between the power reception unit and the electronic unit in power transmission.

2. The power reception unit of claim 1, wherein the first authentication indicates that the power reception unit is a proper unit.

3. The power reception unit of claim 1, further comprising:
a battery.

4. The power reception unit of claim 1, further comprising:
an authentication section.

5. The power reception unit of claim 1, further comprising:
a charging section.

6. The power reception unit of claim 5, wherein the charging section comprises a rectification circuit and a charging circuit.

7. The power reception unit of claim 1, wherein the power reception unit is configured to receive wireless power during pre-charging that is performed before the second authentication.

8. The power reception unit of claim 7, wherein the power reception unit is configured to transmit information on necessary power amount to the electronic unit.

9. The power reception unit of claim 7, wherein the power reception unit is configured transmit information on a current operation state to the electronic unit.

10. A power receiver, comprising:
a power receiving unit configured to:
send a charging request to a power transmitting unit before performing an authentication between the power transmitting unit and the power receiving unit, and
receive wireless power from the power transmitting unit during main charging after performing the authentication between the power transmitting unit and the power receiving unit,
wherein the power reception unit is configured to receive wireless power during pre-charging that is performed after the power reception unit is detected.

11. The power receiver according to claim 10, wherein the power receiving unit includes a power transmission coil and a power transmission capacitor element.

12. The power receiver according to claim 10, wherein the power transmitting unit is configured to receive the power from the power transmitting unit using at least one of a magnetic field and an electric field coupling to receive the power.

13. The power receiver according to claim 10, further comprising:
a communication section configured to communicate with the power transmitting unit by either a wireless communication or a wired communication.

14. The power receiver according to claim 10, further comprising:
a communication section that is configured to perform communication with an electronic unit; and
a control section that is configured to:
control the communication section,
perform first authentication between the power reception unit and the electronic unit, and
perform second authentication between the power reception unit and the electronic unit in power transmission.

15. The power reception unit of claim 14, wherein the first authentication indicates that the power reception unit is a proper unit.

16. The power reception unit of claim 14, further comprising:
a battery.

17. The power reception unit of claim 14, further comprising:
an authentication section.

18. The power reception unit of claim 14, further comprising:
a charging section.

19. The power reception unit of claim 18, wherein the charging section comprises a rectification circuit and a charging circuit.

20. The power reception unit of claim 14, wherein the power reception unit is configured to receive wireless power during pre-charging that is performed before the second authentication.

21. The power reception unit of claim 20, wherein the power reception unit is configured to transmit information on necessary power amount to the electronic unit.

22. The power reception unit of claim 20, wherein the power reception unit is configured transmit information on a current operation state to the electronic unit.

* * * * *